3,141,852
NUCLEAR FUELS

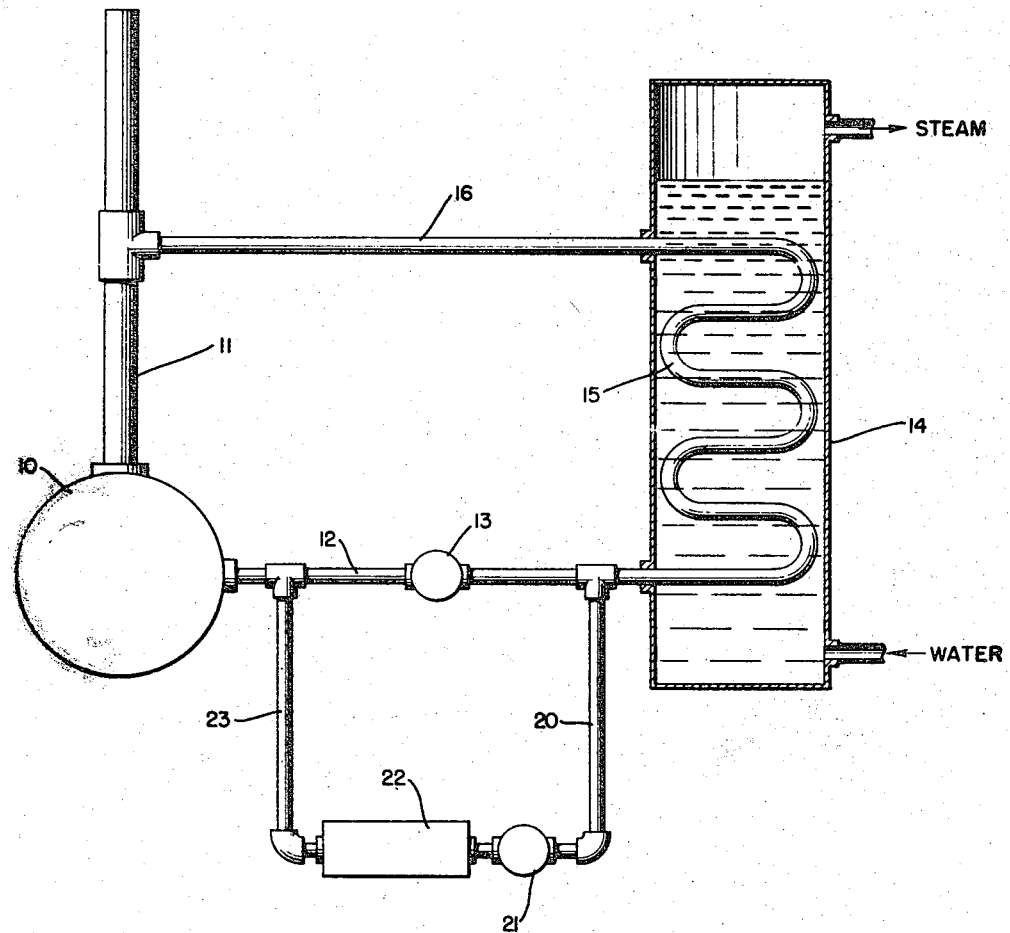

Jacques Henri Dressler, Courbevoie, and Stephane Joseph Dufaure de Lajarte, Paris, France, assignors to Compagnie de Saint-Gobain, Paris, France
Filed Nov. 17, 1958, Ser. No. 774,533
Claims priority, application France Nov. 18, 1957
12 Claims. (Cl. 252—301.1)

This invention relates to nuclear fuels, and to their preparation and manner of use.

It is an object of the invention to employ as a fuel in a nuclear reactor, especially in reactors of homogeneous type, particles of glass containing the nuclear material. Nuclear material means any element, such as uranium, eventually combined with other elements, for instance in form of oxide, which is, or an isotope of which is fissionable or fertile. Fertile element is an element such as uranium 238 which reacts with neutrons to produce a fissionable element. In reactors of the homogeneous type, a fluid, generally heavy water, is used in which the nuclear fuel is dissolved. The fluid is put into circulation through the reactor and a heat exchanger and acts as a cooling medium for the reactor, eventually as a moderator for slowing neutrons, and also serves to extract those products of fission which are generated from the nuclear fuel in the reactor.

In order to facilitate the extraction of the products of fission from the reactor, it has been proposed to use a liquid in which the nuclear fuel, for instance uranium oxide, is not in solution but is in suspension. While this proposal makes easier the separation from the liquid of the products of fission it also has disadvantages because the use of such suspended particles in liquids gives rise to disaggregation of the particles, precipitation of sludges, and abrasion and wearing of the conduits and moving parts of the apparatus, including the walls and pumps.

Another object of the invention is to reduce the imperfections of reactors employing nuclear fuels in suspension and to produce an improved system for employing nuclear reactors, particularly of the homogeneous type, in which the nuclear fuel is carried through the reactors in suspension in a liquid.

Another object of the invention is to provide fissionable or/and fertile materials, capable of suspension in a liquid for use in nuclear reactors, which are proof against disaggregation and wear, which reduce abrasion in the apparatus in which used, eliminate or greatly reduce sludge formation, and provide no additional section of capture for neutrons.

Another object of the invention is to provide a process for the preparation of such fissionable and/or fertile materials.

These materials are obtained, generally speaking, by incorporating in a glass, substantially free of those isotopes which afford a large section of capture to neutrons, a substantial quantity, up to about 45% by weight, of nuclear material and by dividing the glass into particles, and rounding the particles. In the bead formation, the finely divided glass containing the fissionable material is formed into rounded beads by heating them to about their softening temperature while separated from one another.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

The drawing is a diagram of a nuclear reactor connected to a heat exchanger by pipes which permit the circulation of a carrier liquid containing suspended nuclear fuel according to this invention. The diagram also shows a fuel reprocessing system connected to the main system.

In the drawing, the numeral 10 indicates a reactor core which is supplied with a nuclear fuel suspended in a carrier liquid through pipe 11 and which delivers the carrier liquid and the suspended nuclear fuel to pipe 12 by pump 13 to a heat exchanger 14 in which there is a coil 15 through which the suspension moves until it is discharged into a pipe 16 which connects with the pipe 11. The heat exchanger 14 receives cold water at the bottom and discharges steam at the top. The reprocessing of the fuel is carried out by a diversionary pipe line 20 from which the suspension can be withdrawn during the operation of the apparatus and pumped by pump 21 to a fuel reprocessing station 22 in which the suspended material can be separated by filtration, centrifugation or the like to be treated and to extract the products of fission generated from the nuclear material in the reactor and to recover the non-used nuclear fuel and to eliminate impurities.

According to the invention, the nuclear fuel is incorporated in glass. This incorporation may be obtained by different processes.

In one form of the invention, the nuclear material, in the form of an oxide, is included in glass as one of the constituents thereof by fusion, just as the other constituents of the glass are included by fusion, such as silica, alkalis and alkaline earth oxides.

It has been shown by tests that one may introduce into glass as much as 45% by weight of uranium oxide. Such glass may be composed essentially of silica, uranium oxide, and alkaline oxides of $K_2O$ and $Na_2O$. The $Na_2O$ oxide may be advantageously substituted for $K_2O$ but should not exceed 50% of the molecular weight of total alkali. Such glass may also contain, although they are not necessary, oxides such as $Al_2O_3$, CaO, MgO, BaO and ZnO, but the total of such oxides should not ordinarily exceed 10% of the weight of the glass. The oxides of boron, $B_2O_3$, can also be used. In such glasses uranium oxide also plays the part of a stabilizing oxide. One should eliminate from such compositions those isotopes, particularly those of boron, which present a large section of capture to neutrons, so that the factor of poisoning of the vitreous material does not exceed that value which is tolerable for the particular use.

The composition of these glasses, by weight percent, may be as follows:

$SiO_2$ ---------------------- 35–45%.
$UO_2$ ---------------------- 20–45%.
$Na_2O+K_2O$ -------------- 15–25%, of which $Na_2O$ is 0–8%.

After this glass has been made, it is finely divided by any appropriate method such as by crushing. The fragments are classified by screening or any other known methods, those which are too large or too small for use being re-melted and again broken. The particles produced by the crusher are irregular, and they are transformed to spheroids by bringing their surfaces to softening temperature while separated from each other. This can be accomplished satisfactorily by blowing the particles into a high-temperature stream of gas, such as burning flame, allowing the particles to remain in the flame only long enough to produce the spheroidal form by softening of the glass surfaces. This process permits the production of glass particles of spheroidal form, throughout which the nuclear material is homogeneously distributed.

EXAMPLE 1

*Preparation of Microbeads of Uranium Glass*

Glass having the composition

|  | Percent by weight |
|---|---|
| $SiO_2$ | 39 |
| $UO_2$ | 42 |
| $Na_2O$ | 8 |
| $K_2O$ | 11 | was melted at about 1450° C. After cooling, the glass was powdered in a ball mill so that practically all the powder passed a 300-mesh screen. From this powder there were selected by screening those particles having dimensions between 10 and 60 microns, employing the method of sedimentation in which the powder was suspended in a liquid (water, or a mixture of water and ethyl alcohol). The particles which settled out too fast or too slowly were isolated from the bulk of the product and returned for remelting. The particles which settled moderately were of satisfactory size for the subsequent treatment. In some cases, the gross and fines were chemically treated to recover the uranium.

The particles of proper size were mechanically dispersed in water, and the suspension was sprayed into burning gases having a temperature between 1500° and 1800° C., which is very much higher than the softening point of the glass, which is about 700° C. A few seconds in the flame was sufficient to soften the glass so that its surface tension compelled the particles to assume a spherical form. The time required in the flame to transform the particles from their irregular shape to microbeads of approximately spherical form is shorter as the temperature is higher. The time in the flame can be controlled by the length of the flame, or the distance traversed by the hot gas, or the length of that portion of the flame which is at the high temperature. The particles are thereafter removed from the flame by any satisfactory means, usually physical. A particularly simple and effective means of separating the microbeads from the flame, which eliminates all loss of product, is to bring the flame into contact with water. The microbeads are captured by the water, are washed with nitric acid, then with pure water, and are finally dried.

In another form of the invention, the nuclear material is introduced into the glass by fritting particles of glass with particles of nuclear material, such as uranium or thorium oxide, which have been mixed together in a state of fine division. For example, a glass powder and a powder of the nuclear material may be homogeneously intermingled until the nuclear material is uniformly distributed throughout the glass, and the mixture then fritted, at a temperature which is equal or superior to the softening point of the glass employed. For homogeneously intermingling, it is possible to use a mechanical mixing of the powders; it is also possible to impregnate the glass powder with a solution of a chemical compound of the nuclear element, and to eliminate the solvent, for example by heating. The glass acts as a binder which coats the grains of nuclear material. The crushing of the fritted mass produces solid fragments of irregular shape in which the nuclear material is incorporated in glass. The subjecting of these irregular particles to heating so that the particles cannot attach themselves to one another, gives to the particles a rounded form and covers the sharp edges of the nuclear material with glass.

It is possible to incorporate in glass by this invention substantial quantities of uranium oxide or other nuclear materials, for example, more than 20%, without the presence of the oxide constituting an obstacle to the transformation of the broken fragments into the rounded particles which we call microbeads.

EXAMPLE 2

*Manufacture of Heterogeneous Particles Containing Glass and Uranium*

This example relates to the fritting of glass powder with particles of intermixed uranium oxides.

Glass having the composition

|  | Percent by weight |
|---|---|
| $SiO_2$ | 65 |
| $Al_2O_3$ | 4 |
| $TiO_2$ | 8 |
| $Na_2O$ | 10 |
| $CaO$ | 8 |
| $MgO$ | 5 | was melted at 1450° C., then broken up in a ball mill so that the greater part of the grains passed through a 300-mesh screen. Thereafter, equally fine particles of uranium oxide, $UO_2$, were mixed in a weight percent of 30. The uniform mixture thus obtained was heated to 900° C., a temperature substantially above that of the softening point of the glass. The uranium oxide was thus dispersed in the vitreous mass, but without combining therewith, to form a homogeneous composition, because the temperature of 900° C. was insufficient to cause the uranium oxide to enter into reaction with the glass.

The mass was cooled and again broken up in the ball mill, after which the particles, of diameter between 10 and 60 microns, were isolated and blown into a high-temperature gas current as described in Example 1. The products formed were microbeads containing particles of uranium oxide dispersed in the vitreous mass.

During the transformation of the irregularly shaped particles to the spherical form by passage through the high temperature gas, the uranium oxide did not enter into any substantial reaction with the surrounding glass. The heating of the particles was very intense, lasted only a very short time, and was followed by rapid cooling, which prevented any substantial chemical reaction between the glass and the uranium oxide.

A third form of the invention involves the impregnation of a porous body of glass with a solution containing a compound of the nuclear element to be introduced, from which the solvent is finally eliminated, leaving the surfaces of glass with an adherent coating of the nuclear compound. The best manner of carrying out this form of the invention is to provide a porous body, such as is produced by sintering glass granules together at their points of contact without closing the pores, and impregnating the porous body with a solution of a compound of the nuclear element or elements to be introduced. The impregnating fluid may be a solution of a salt decomposable by heat, such as uranium nitrate, with which the porous glass is impregnated, the whole being thereafter carried to a temperature high enough to decompose the salt and eliminate the solvent. This impregnation, as stated, is preferably carried out on a piece of porous glass, which is thereafter transformed to rounded particles. Alternatively, this impregnation may be carried out on fragments of a porous glass which thereafter are transformed to rounded particles, and also on previously rounded fragments of porous glass.

The best mode of carrying out this form of the invention is stated in the following example:

EXAMPLE 3

Glass having a composition similar to that of Example 2 was powdered to pass a 150-mesh screen. The powder was deposited in a layer several millimeters thick on a refractory steel support and raised to a temperature close to its softening point, so that the grains became integrated at their points of contact. The heating was terminated before the pores were closed, leaving an interconnected porous network. This technique is known and is used in making porous glass filters. After cooling, the porous plates were impregnated with a solution of uranyl nitrate, the concentration being determined so that the porous mass, after reaction, contained about 25% uranium oxide. The plates were dried and raised to a temperature of 900°–1000° C., which eliminated residual solvent, discharged occluded gas, and closed the pores. The vitreous mass, containing 25% uranium oxide, was crushed to particles of the size hereinabove indicated, which were then rounded as described in Example 1.

In the practice of the invention in all its forms, no particular control of temperature is needed beyond that which is customarily employed by persons skilled in the art of the fusion of glass of that composition.

The particles which do not have the dimensions or the density desired can be separated out and reworked. This separation can be carried out mechanically according to size, and by sink and float methods according to density, as the density of the particles may vary according to the proportion of nuclear material retained.

The forms of the invention illustrated by Examples 2 and 3 permit one great liberty in choosing the glass to be used. One may select that glass which has the characteristics best adapted to suit the particular use.

The invention has as one of its objects to use in nuclear reactors, notably those of homogeneous type, particles of glass containing nuclear material suspended in a carrier liquid. Heretofore, the fluid used in such reactors was one in which the nuclear fuel was dissolved and put into circulation so as to travel between the reactor and the heat exchanger. In order to assist in the extraction of products of fission, this invention uses in the fluid the nuclear fuel not in solution, but in suspension, and encased in glass. By this invention the useful life of the nuclear particles is increased, because they are not rapidly disintegrated by rubbing against each other and against the walls of the apparatus. The parts of the apparatus last longer because they are not as rapidly worn away by the rounded glass particles as they would be by contact with grains of the fissionable material itself.

According to the invention, the nuclear material is homogeneously distributed or dispersed in a finely divided state in the glass, either as a constituent of the glass, or as a material adherent to the glass. The glasses employed are free from elements which offer a large section of capture of neutrons. The content of nuclear material may be very high, being equivalent to 20%–45% of uranium oxide.

It is possible to combine in each microbead of glass, two or more fissionable or fertile isotopes or elements, for example, uranium oxide and thorium oxide. It is also possible to use in a same reactor microbeads of two or more kinds, differentiated by the nature of the nuclear material encased in the glass. The particles of different nature may be used together in a reactor having a single region, or separately in a reactor having a plurality of regions.

As many apparently widely different embodiments of the present invention may be made without departing from the spirit and scope thereof, it is to be understood that the invention is not limited to the specific embodiments.

What is claimed is:

1. Atomic fuel comprising glass beads of vitreous exterior and diameters between a few microns and a hundred microns, containing at least one component selected from the group consisting of fissionable and fertile elements and compounds.

2. Atomic fuel according to claim 1 in which the fuel consists essentially of a liquid holding the glass beads in suspension.

3. Atomic fuel for use in homogeneous reactors consisting in its essential parts of a suspension of water and rounded glass beads of vitreous exterior and diameters between a few microns and a hundred microns, the beads containing as constituents of the glass an oxide of at least one of the group of fissionable and fertile materials in an amount equivalent to about 20–45% $UO_2$, and being substantially free from isotopes offering a large section of capture to neutrons.

4. Rounded glass microbeads according to claim 3 containing an effective amount up to about 45% by weight of said group.

5. An atomic fuel particularly adapted to reactors of homogenous, circulating type, consisting in its essential constituents of a liquid suspension of glass beads of particle sizes between a few microns and a hundred microns which contain a substantial quantity of material from a group consisting of fissionable and fertile materials.

6. An atomic fuel according to claim 5 in which the glass beads are spheroidal, have the composition $SiO_2$ about 35–45% by weight; alkali metal oxides 15–25%; of which $Na_2O$ is about 0–8%; metal oxides of the type of $Al_2O_3$, CaO, MgO, BaO, ZnO about 0–10%; material from the class consisting of fissionable and fertile materials equivalent to about 20–45% of $UO_2$, and are substantially free of oxides which present a large section of capture to netrons.

7. A method of making glass covered atomic fuel adapted to use, inter alia, in nuclear reactors of homogenous type, that comprises vitrifying glass making materials containing a metal oxide of at least one of the class of fissionable and fertile elements, and substantially free of isotopes presenting a large section of capture to neutrons, finely dividing the vitrified product to diameters between a few microns and a hundred microns rounding the particles and providing them with a vitreous exterior by subjecting them in motion to softening temperature and time, and cooling the rounded particles.

8. A method according to claim 7 in which the glass consists essentially of the following composition: $SiO_2$ about 35–46%; fissionable and fertile material equivalent in effect to about 20–45% $UO_2$; $K_2O$ and $Na_2O$ about 15–26% with $Na_2O$ about 0–8%; and glass making raw materials consisting of metal oxides of the type of $Al_2O_3$, CaO, MgO, BaO, ZnO about 0–10%.

9. A method of making atomic fuel according to claim 7 in which the cooling step includes blowing the hot beads into water.

10. A method according to claim 9 in which the cooled beads are washed in nitric acid and then washed in water.

11. A method according to claim 7 in which the particles are admitted to the softening flame in admixture with water.

12. The method of making atomic fuel that comprises forming a finely divided glass, heating the glass until the particles fuse at their points of contact and cooling the mass, impregnating the porous mass with a solution of a soluble compound from the class consisting of fertile and fissionable materials, eliminating the solvent, finely dividing the mass to particles of diameters between a few and a hundred microns, and rounding the particles into beads of vitreous surface by subjecting them while separated to brief exposure to softening temperature.

References Cited in the file of this patent

UNITED STATES PATENTS

| | | |
|---|---|---|
| 1,470,512 | Tromba | Oct. 9, 1923 |
| 2,676,892 | McLaughlin | Apr. 27, 1954 |
| 2,782,158 | Wheeler | Feb. 19, 1957 |

(Other references on following page)

UNITED STATES PATENTS

| | | |
|---|---|---|
| 2,794,301 | Law et al. | June 4, 1957 |
| 2,809,931 | Daniels | Oct. 15, 1957 |
| 2,824,784 | Hansen et al. | Feb. 25, 1958 |
| 2,850,845 | Kelly | Sept. 9, 1958 |
| 2,872,719 | Brassfield et al. | Feb. 10, 1959 |
| 2,877,091 | Hiskey | Mar. 10, 1959 |

FOREIGN PATENTS

| | | |
|---|---|---|
| 357,273 | Italy | Mar. 9, 1938 |

OTHER REFERENCES

AEC Document ISC-258, June 4, 1956, available from Technical Information Service, Industrial Reports Section, P.O. Box 1001, Oak Ridge, Tenn., price 35¢. (Copy in Library.)

AEC Document KAPL-1877, July 1, 1957, available same as KAPL-1866.

Nucleonics, August 1957, pages 94-98. (Copy in Library or Div. 46.)

Nuclear Engineering, vol. 2, pp. 333-4, August 1957. (Note that this is published in London.)

AEC Document KAPL-1866, Sept. 9, 1957, available from AEC, Germantown, Md. (Copy in Library.)

AEC Document KAPL-1475, 1957, available same as KAPL-1866.

Reactor Core Materials, prepared by Battelle Memorial Institute, May 1958, vol. 1, No. 2. (Copy in Library.) Available from U.S. Government Printing Office, page 15.